United States Patent
Tang

(10) Patent No.: US 12,281,916 B2
(45) Date of Patent: Apr. 22, 2025

(54) METHOD, APPARATUS, AND COMPUTER PROGRAM PRODUCT FOR MAP GEOMETRY GENERATION BASED ON DATA AGGREGATION AND CONFLATION WITH STATISTICAL ANALYSIS

(71) Applicant: HERE GLOBAL B.V., Eindhoven (NL)

(72) Inventor: Fei Tang, Aarau (CH)

(73) Assignee: HERE GLOBAL B.V., Eindhoven (NL)

( * ) Notice: Subject to any disclaimer, the term of this patent is extended or adjusted under 35 U.S.C. 154(b) by 362 days.

(21) Appl. No.: 17/662,151

(22) Filed: May 5, 2022

(65) Prior Publication Data

US 2023/0358567 A1 Nov. 9, 2023

(51) Int. Cl.
*G06T 7/90* (2017.01)
*G01C 21/00* (2006.01)
(Continued)

(52) U.S. Cl.
CPC ..... *G01C 21/3867* (2020.08); *G01C 21/3841* (2020.08); *G01C 21/3859* (2020.08);
(Continued)

(58) Field of Classification Search
CPC ............ G01C 21/3867; G01C 21/3841; G01C 21/3859; G01C 21/3819; G06F 16/29;
(Continued)

(56) References Cited

U.S. PATENT DOCUMENTS

| 8,949,021 B2 | 2/2015 | Witmer |
| 9,171,485 B2 | 10/2015 | Gautama et al. |

(Continued)

FOREIGN PATENT DOCUMENTS

| CN | 101924647 A | 12/2010 |
| CN | 107743431 A | 2/2018 |

(Continued)

OTHER PUBLICATIONS

Agmon et al, "An algorithm for finding the distribution of maximal entropy", Journal of Computational Physics, vol. 30, No. 2 (Feb. 1979), 9 pages.

(Continued)

*Primary Examiner* — Chuong A Ngo
(74) *Attorney, Agent, or Firm* — ALSTON & BIRD LLP

(57) ABSTRACT

A method is provided automatically creating map geometry from data from various sources gathered within a geographical area using data aggregation and conflation with statistical analysis. Methods may include: receiving observation data associated with a geographic area; rasterizing objects within the observation data onto corresponding channels in a raster image corresponding to the geographic area having a given resolution; determining a distribution of locations of the objects parameterized by values in different channels in the raster image from the observation data; extracting analytic geometries from the raster image; generating map geometry based on the extracted analytic geometries; and updating a map database with the generated map geometry.

20 Claims, 7 Drawing Sheets

(51) Int. Cl.
  *G06F 16/29* (2019.01)
  *G06T 7/143* (2017.01)
  *G06T 7/60* (2017.01)

(52) U.S. Cl.
  CPC .............. *G06F 16/29* (2019.01); *G06T 7/143* (2017.01); *G06T 7/60* (2013.01); *G06T 7/90* (2017.01); *G06T 2207/20044* (2013.01)

(58) Field of Classification Search
  CPC .. G06T 7/143; G06T 7/60; G06T 7/90; G06T 2207/20044; G06V 20/13; G06V 20/17; G06V 20/56
  See application file for complete search history.

(56) References Cited

U.S. PATENT DOCUMENTS

| | | | |
|---|---|---|---|
| 9,177,404 B2 | 11/2015 | Ramachandran et al. | |
| 9,658,074 B2 | 5/2017 | Dorum | |
| 10,266,280 B2 | 4/2019 | Derenick et al. | |
| 10,444,020 B2 | 10/2019 | Dorum | |
| 10,546,400 B2 | 1/2020 | Dorum | |
| 10,580,292 B2 | 3/2020 | Dorum | |
| 10,760,920 B2 | 9/2020 | Sekiyama | |
| 11,030,476 B2 | 6/2021 | Xu et al. | |
| 11,068,515 B2 | 7/2021 | Bukowski | |
| 11,093,760 B2 | 8/2021 | Savla et al. | |
| 11,192,558 B2 | 12/2021 | Thompson | |
| 11,209,548 B2 | 12/2021 | Yang et al. | |
| 11,210,537 B2 | 12/2021 | Koivisto et al. | |
| 11,227,500 B2 | 1/2022 | Wang | |
| 11,244,500 B2 | 2/2022 | Marschner et al. | |
| 2003/0009287 A1 | 1/2003 | Howard et al. | |
| 2009/0210388 A1 | 8/2009 | Elson et al. | |
| 2013/0033591 A1 | 2/2013 | Takahashi et al. | |
| 2014/0219558 A1 | 8/2014 | Teng et al. | |
| 2016/0358477 A1 | 12/2016 | Ansari | |
| 2017/0169313 A1 | 6/2017 | Choi et al. | |
| 2017/0177933 A1 | 6/2017 | Mittal et al. | |
| 2018/0003512 A1 | 1/2018 | Lynch | |
| 2018/0107190 A1 | 4/2018 | Marshall et al. | |
| 2019/0147320 A1 | 5/2019 | Mattyus et al. | |
| 2019/0147331 A1 | 5/2019 | Arditi | |
| 2019/0170519 A1 | 6/2019 | Anwar et al. | |
| 2019/0221033 A1 | 7/2019 | Messerlie et al. | |
| 2019/0258878 A1 | 8/2019 | Koivisto et al. | |
| 2019/0287393 A1 | 9/2019 | Fowe et al. | |
| 2019/0325738 A1 | 10/2019 | Dorum | |
| 2019/0355103 A1 | 11/2019 | Baek et al. | |
| 2020/0302223 A1 | 9/2020 | Dutta et al. | |
| 2020/0410274 A1 | 12/2020 | Satoh et al. | |
| 2021/0012166 A1 | 1/2021 | Braley et al. | |
| 2021/0019516 A1 | 1/2021 | Mittal et al. | |
| 2021/0056847 A1 | 2/2021 | Saxena et al. | |
| 2021/0113130 A1 | 4/2021 | Tran | |
| 2021/0164787 A1 | 6/2021 | Soni et al. | |
| 2021/0209368 A1 | 7/2021 | Hao et al. | |
| 2021/0224466 A1 | 7/2021 | Nehrenberg et al. | |
| 2021/0302170 A1 | 9/2021 | Xie et al. | |
| 2021/0333124 A1 | 10/2021 | Heo et al. | |
| 2021/0342585 A1 | 11/2021 | Fleisig et al. | |
| 2022/0113162 A1 | 4/2022 | Nomura | |
| 2022/0156612 A1 | 5/2022 | Ren et al. | |
| 2022/0198339 A1 | 6/2022 | Zhao et al. | |
| 2022/0366259 A1 | 11/2022 | Wang et al. | |
| 2023/0213945 A1* | 7/2023 | Sajjan | G05D 1/0088 701/28 |
| 2023/0252795 A1 | 8/2023 | Tong et al. | |

FOREIGN PATENT DOCUMENTS

| | | |
|---|---|---|
| EP | 3280974 A1 | 2/2018 |
| WO | WO 2016/162665 A1 | 10/2016 |
| WO | WO 2021/002190 A1 | 1/2021 |

OTHER PUBLICATIONS

Alotaibi A., "Deep Generative Adversarial Networks for Image-to-Image Translation: A Review", Symmetry, vol. 12, No. 10, (Oct. 16, 2020), 26 pages.

Arman et al., "Lane-level routable digital map reconstruction for motorway networks using low-precision GPS data", Transportation Research Part C: Emerging Technologies, (Jun. 3, 2021), 21 pages.

Batra, A., "Road Topology Extraction from Satellite Images by Knowledge Sharing", International Institute of Information Technology, Deemed University, (Jul. 2019), 75 pages.

Biagioni et al., "Inferring Road Maps from Global Positioning System Traces: Survey and Comparative Evaluation", Department of Computer Science, University of Illinois at Chicago, (2012), 11 pages.

Chen et al., "Probabilistic Modeling of Traffic Lanes from GPS Traces", 18th ACM SIGSPATIAL International Symposium on Advances in Geographic Information Systems, ACM-GIS 2010, (Nov. 3-5, 2010), 8 pages.

Dorum, O., "Deriving Double-Digitized Road Network Geometry from Probe Data", SIGSPATIAL '17: Proceedings of the 25th ACM SIGSPATIAL International Conference on Advances in Geographic Information Systems, (Nov. 2017), 10 pages.

Hartmann et al., "Night time road curvature estimation based on convolutional neural networks", 2013 IEEE Intelligent Vehicles Symposium (IV), (Jun. 23-26, 2013), 6 pages.

He et al., "Sat2Graph: Road Graph Extraction through Graph-Tensor Encoding", arXiv:2007.09547v1, (Jul. 19, 2020), 17 pages.

Horritt et al., "Developing a Prototype Tool for Mapping Flooding From All Sources Phase 1: Scoping and Conceptual Method Development", Department for Environment Food and Rural Affairs, Flood and Coastal Erosion Risk Management Research and Development Programme, Environment Agency, (Mar. 2010), 179 pages.

Kaji et al., "Overview of Image-To-Image Translation by Use of Deep Neural Networks: Denoising, Super-Resolution, Modality Conversion, and Reconstruction in Medical Imaging", Radiological Physics and Technology 12(4), (Jun. 2019), 14 pages.

Kupyn et al., "DeblurGAN-v2: Deblurring (Orders-of-Magnitude) Faster and Better", 2019 IEEE/CVF International Conference on Computer Vision (ICCV), (2019), 10 pages.

Kupyn et al., "DeblurGAN: Blind Motion Deblurring Using Conditional Adversarial Networks", 2018 IEEE/CVF Conference on Computer Vision and Pattern Recognition, (Nov. 19, 2017), pp. 8183-8192.

Mi et al., "HDMapGen: A Hierarchical Graph Generative Model of High Definition Maps", 2021 IEEE/CVF Conference on Computer Vision and Pattern Recognition (CVPR), (Jun. 1, 2021), 10 pages.

Narayan et al., "Maximum Entropy Image Restoration in Astronomy", Annual Review of Astronomy and Astrophysics, vol. 24, No. 1, (Nov. 2003), 44 pages.

Redmon et al., "YOLO: Real-Time Object Detection", Retrieved on Oct. 18, 2022, Retrieved from the Internet: URL<https://pjreddie.com/darknet/yolo>, (2018), 9 pages.

Spolti et al., "Application of U-Net and Auto-Encoder to the Road/Non-Road Classification of Aerial Imagery in Urban Environments", 15th International Conference on Computer Vision Theory and Applications, (Jan. 2020), 8 pages.

Vu, "Vehicle Perception: Localization, Mapping with Detection, Classification and Tracking of Moving Objects", Computer Science, Institut National Polytechnique de Grenoble—INPG, (2009), 127 pages.

Xiao et al., "VAE-info-cGAN: generating synthetic images by combining pixel-level and feature-level geospatial conditional inputs", arXiv:2012.04196v1, (Dec. 8, 2020), 10 pages.

Zhang et al., "A Fast Learning Method for Accurate and Robust Lane Detection Using Two-Stage Feature Extraction with YOLO v3", Sensors 2018 (Dec. 6, 2018), 20 pages.

U.S. Appl. No. 17/662,165, filed May 5, 2022, entitled, "Method, Apparatus, And Computer Program Product For Map Data Generation From Probe Data Imagery", 43 pages.

(56) References Cited

OTHER PUBLICATIONS

U.S. Appl. No. 17/662,129, filed May 5, 2022, entitled, "Method, Apparatus, And Computer Program Product For Map Geometry Generation Based On Object Detection", 40 pages.
U.S. Appl. No. 17/662,158, filed May 5, 2022, entitled, "Method, Apparatus, And Computer Program Product For Probe Data- Based Geometry Generation", 35 pages.
U.S. Appl. No. 17/662,136, filed May 5, 2022, entitled, "Method, Apparatus, And Computer Program Product For Lane Geometry Generation Based On Graph Estimation", 40 pages.
U.S. Appl. No. 17/662,144, filed May 5, 2022, entitled, "Method, Apparatus, And Computer Program Product For Map Geometry Generation Based On Data Aggregation And Conflation", 43 pages.
Non-Final Office Action for U.S. Appl. No. 17/662,129 dated Aug. 24, 2023.
Non-Final Office Action for U.S. Appl. No. 17/662,158 dated Sep. 13, 2023.
Non-Final Office Action for U.S. Appl. No. 17/662,136 dated Sep. 14, 2023.
Non-Final Office Action for U.S. Appl. No. 17/662,144 dated Jan. 5, 2024.
Extended European Search Report for European Application No. 23171578.0 dated Oct. 10, 2023, 8 pages.
Extended European Search Report for European Application No. 23171576.4 dated Oct. 6, 2023, 9 pages.
Extended European Search Report for European Application No. 23171637.4 dated Oct. 19, 2023, 7 pages.
Extended European Search Report for European Application No. 23171632.5 dated Oct. 10, 2023, 8 pages.
Final Office Action for U.S. Appl. No. 17/662,129 dated Feb. 15, 2024.
Final Office Action for U.S. Appl. No. 17/662,136 dated Mar. 27, 2024.
Non-Final Office Action for U.S. Appl. No. 17/662,158 dated Mar. 27, 2024.
Advisory Action for U.S. Appl. No. 17/662,129 dated Apr. 25, 2024.
Final Office Action for U.S. Appl. No. 17/662,165 dated Jan. 27, 2025.
Notice of Allowance for U.S. Appl. No. 17/662,129 dated Dec. 9, 2024.
Notice of Allowance for U.S. Appl. No. 17/662,136 dated Dec. 23, 2024.
Final Office Action for U.S. Appl. No. 17/662,144 dated Mar. 11, 2025.

* cited by examiner

METHOD, APPARATUS, AND COMPUTER PROGRAM PRODUCT FOR MAP GEOMETRY GENERATION BASED ON DATA AGGREGATION AND CONFLATION WITH STATISTICAL ANALYSIS

TECHNOLOGICAL FIELD

An example embodiment of the present disclosure relates to the generation of map geometry, and more particularly, to automatically creating map geometry from data from various sources gathered within a geographical area using data aggregation and conflation with statistical analysis.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous lane geometry. Incorrect lane geometry information can be problematic as such lane geometry may be used for route guidance and at least semi-autonomous vehicle control. Inaccurate lane geometries can reduce the effectiveness of route guidance and vehicle autonomy.

BRIEF SUMMARY

A method, apparatus, and computer program product are provided in accordance with an example embodiment for the generation of map geometry, and more particularly, to automatically creating map geometry from data from various sources gathered within a geographical area using data aggregation and conflation with statistical analysis. Embodiments provided herein include an apparatus having at least one processor and at least one memory including computer program code with the at least one memory and computer program code being configured to, with the processor, cause the apparatus to: receive observation data associated with a geographic area; rasterize objects within the observation data onto corresponding channels in a raster image corresponding to the geographic area having a given resolution; determine a distribution of locations of the objects parameterized by values in different channels in the raster image from the observation data; extract analytic geometries from the raster image; generate map geometry based on the extracted analytic geometries; and update a map database with the generated map geometry.

According to some embodiments, causing the apparatus to determine a distribution of locations of the objects parameterized by values in different channels in the raster image from the observation data includes causing the apparatus to calculate a log likelihood of the objects at the locations within the raster image given corresponding distributions as parameterized by values in different channels of the raster image. Causing the apparatus of some embodiments to calculate a log likelihood of the objects at the locations within the raster image given corresponding distributions as parameterized by values in different channels of the raster image includes causing the apparatus to update the values in the different channels of the raster image to increase the log likelihood.

According to certain embodiments, the apparatus is further caused to determine a probability of observing a respective object at pixels proximate a location of the respective object based on the distribution of the location for the respective object. The apparatus of certain embodiments is further caused to render pixels of the rasterized image based on the distribution of locations of the objects parameterized by the values in different channels in the raster image from the observation data. According to some embodiments, channels in the raster image include at least one of pixel color or pixel intensity. Causing the apparatus of some embodiments to extract analytic geometries from the raster image includes causing the apparatus to apply a skeletonization algorithm to the raster image to extract the analytic geometries.

Embodiments provided herein include a method including: receiving observation data associated with a geographic area; rasterizing objects within the observation data onto corresponding channels in a raster image corresponding to the geographic area having a given resolution; determining a distribution of locations of the objects parameterized by values in different channels in the raster image from the observation data; extracting analytic geometries from the raster image; generating map geometry based on the extracted analytic geometries; and updating a map database with the generated map geometry.

According to some embodiments, determining a distribution of locations of the objects parameterized by values in different channels in the raster image from the observation data includes calculating a log likelihood of the objects at the locations within the raster image given corresponding distributions as parameterized by values in different channels of the raster image. According to some embodiments, calculating a log likelihood of the objects at the locations within the raster image given corresponding distributions as parameterized by values in different channels of the raster image include updating the values in the different channels of the raster image to increase the log likelihood.

According to certain embodiments, the method further includes determining a probability of observing a respective object at pixels proximate a location of the respective object based on the distribution of the location for the respective object. The method of certain embodiments further includes rendering pixels of the rasterized image based on the distribution of locations of the objects parameterized by the values in different channels in the raster image from the observation data. According to some embodiments, channels in the raster image include at least one of pixel color or pixel intensity. According to some embodiments, extracting analytic geometries from the raster image includes applying a skeletonization algorithm to the raster image to extract the analytic geometries.

Embodiments provided herein include a computer program product including at least one non-transitory computer-readable storage medium having computer-executable program code instructions stored therein, the computer-executable program code instructions including program code instructions to: receive observation data associated with a geographic area; rasterize objects within the observation data onto corresponding channels in a raster image corresponding to the geographic area having a given resolution; determine a distribution of locations of the objects parameterized by values in different channels in the raster image from the observation data; extract analytic geometries from the raster image; generate map geometry based on the extracted analytic geometries; and update a map database with the generated map geometry.

According to some embodiments, the program code instructions to determine a distribution of locations of the objects parameterized by values in different channels in the raster image from the observation data include program code instructions to calculate a log likelihood of the objects at the locations within the raster image given corresponding distributions as parameterized by values in different channels of the raster image. The program code instructions of some embodiments to calculate a log likelihood of the objects at the locations within the raster image given corresponding distributions as parameterized by values in different channels of the raster image include program code instructions to update the values in the different channels of the raster image to increase the log likelihood.

According to certain embodiments, the computer program product further includes program code instructions to determine a probability of observing a respective object at pixels proximate a location of the respective object based on the distribution of the location for the respective object. The computer program product of certain embodiments further includes program code instructions to render pixels of the rasterized image based on the distribution of locations of the objects parameterized by the values in different channels in the raster image from the observation data. According to some embodiments, channels in the raster image include at least one of pixel color or pixel intensity. The program code instructions of some embodiments to extract analytic geometries from the raster image include program code instructions to apply a skeletonization algorithm to the raster image to extract the analytic geometries. Embodiments described herein further include a computer program product having computer-executable program code portions stored therein, the computer executable program code portions including program code instructions configured to perform any method described herein. Embodiments provided herein include an apparatus including: means for receiving observation data associated with a geographic area; means for rasterizing objects within the observation data onto corresponding channels in a raster image corresponding to the geographic area having a given resolution; means for determining a distribution of locations of the objects parameterized by values in different channels in the raster image from the observation data; means for extracting analytic geometries from the raster image; means for generating map geometry based on the extracted analytic geometries; and means for updating a map database with the generated map geometry.

According to some embodiments, the means for determining a distribution of locations of the objects parameterized by values in different channels in the raster image from the observation data includes means for calculating a log likelihood of the objects at the locations within the raster image given corresponding distributions as parameterized by values in different channels of the raster image. According to some embodiments, the means for calculating a log likelihood of the objects at the locations within the raster image given corresponding distributions as parameterized by values in different channels of the raster image include means for updating the values in the different channels of the raster image to increase the log likelihood.

According to certain embodiments, the apparatus further includes means for determining a probability of observing a respective object at pixels proximate a location of the respective object based on the distribution of the location for the respective object. The apparatus of certain embodiments further includes means for rendering pixels of the rasterized image based on the distribution of locations of the objects parameterized by the values in different channels in the raster image from the observation data. According to some embodiments, channels in the raster image include at least one of pixel color or pixel intensity. According to some embodiments, the means for extracting analytic geometries from the raster image includes means for applying a skeletonization algorithm to the raster image to extract the analytic geometries.

BRIEF DESCRIPTION OF THE DRAWINGS

Figure 1:
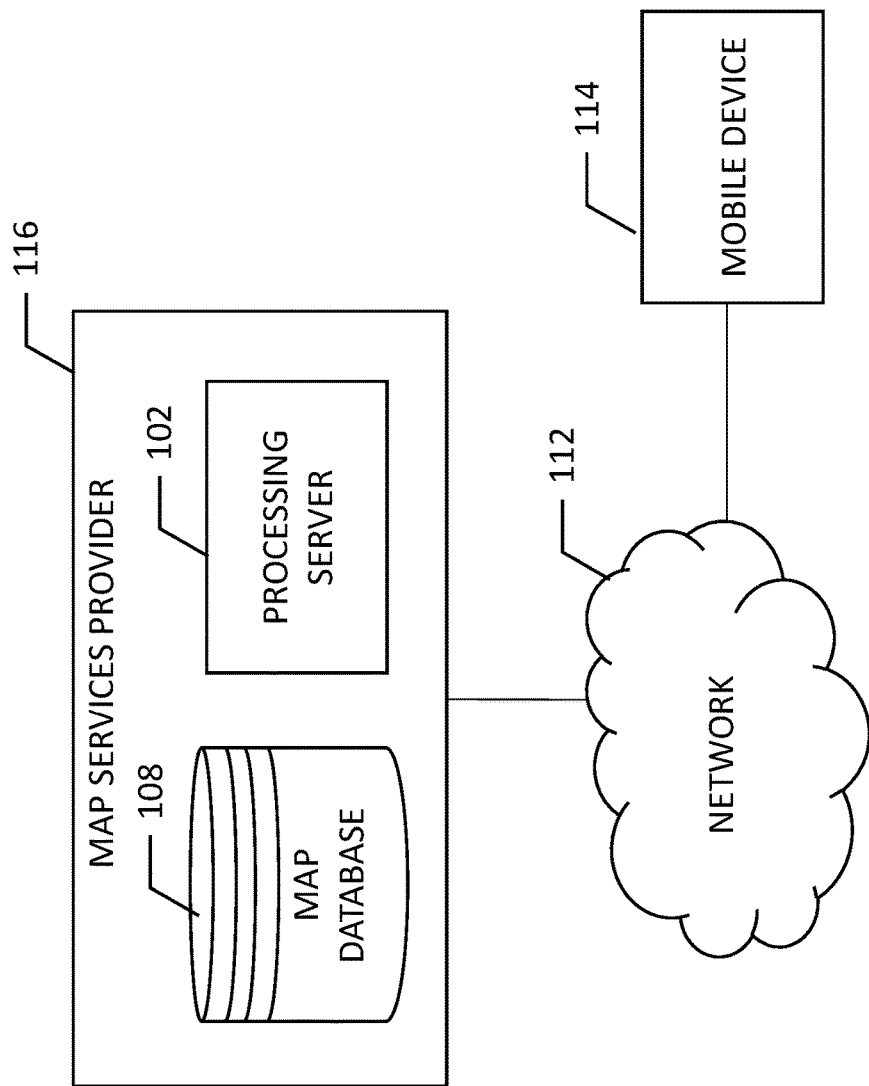
Figure 2:
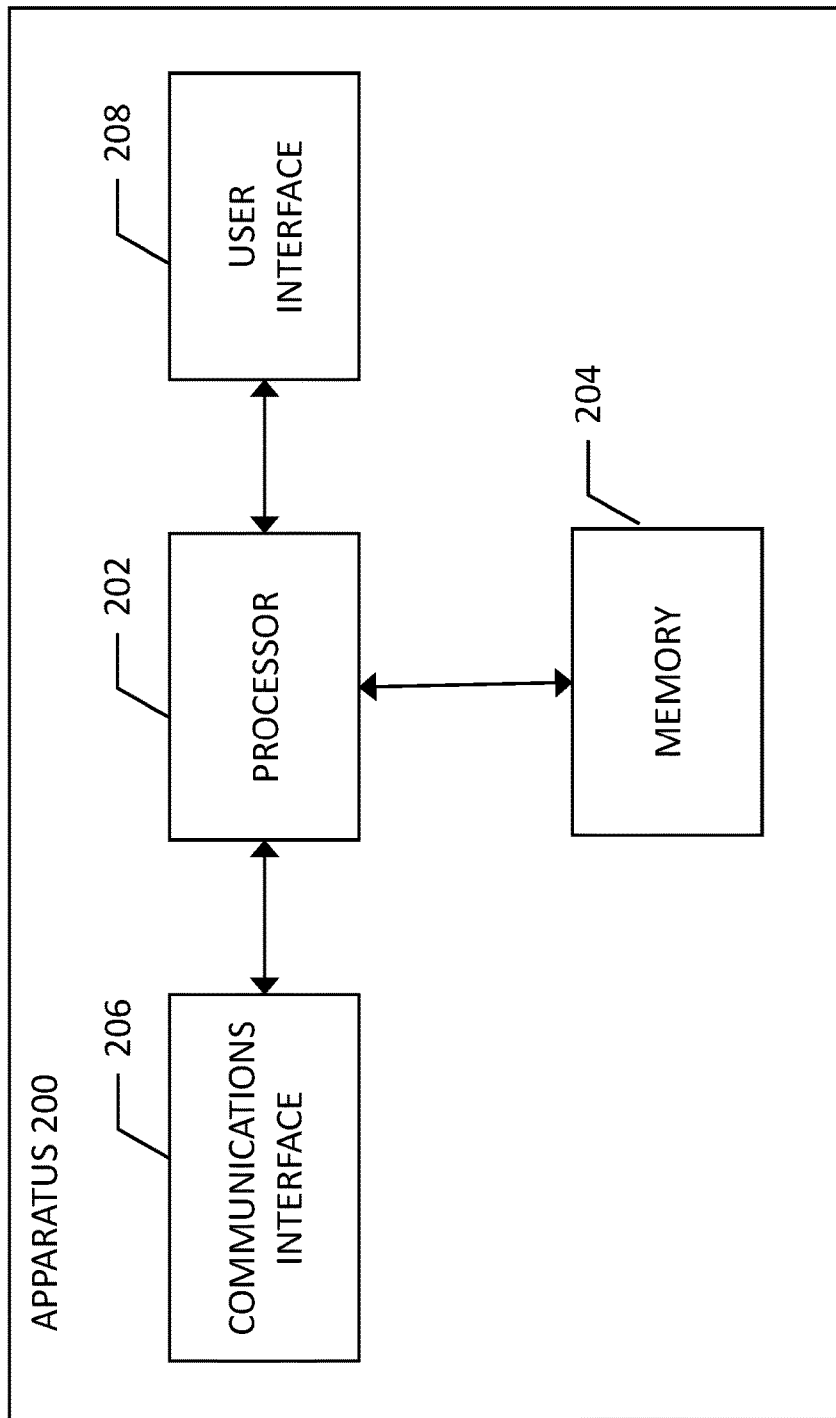
Figure 3:
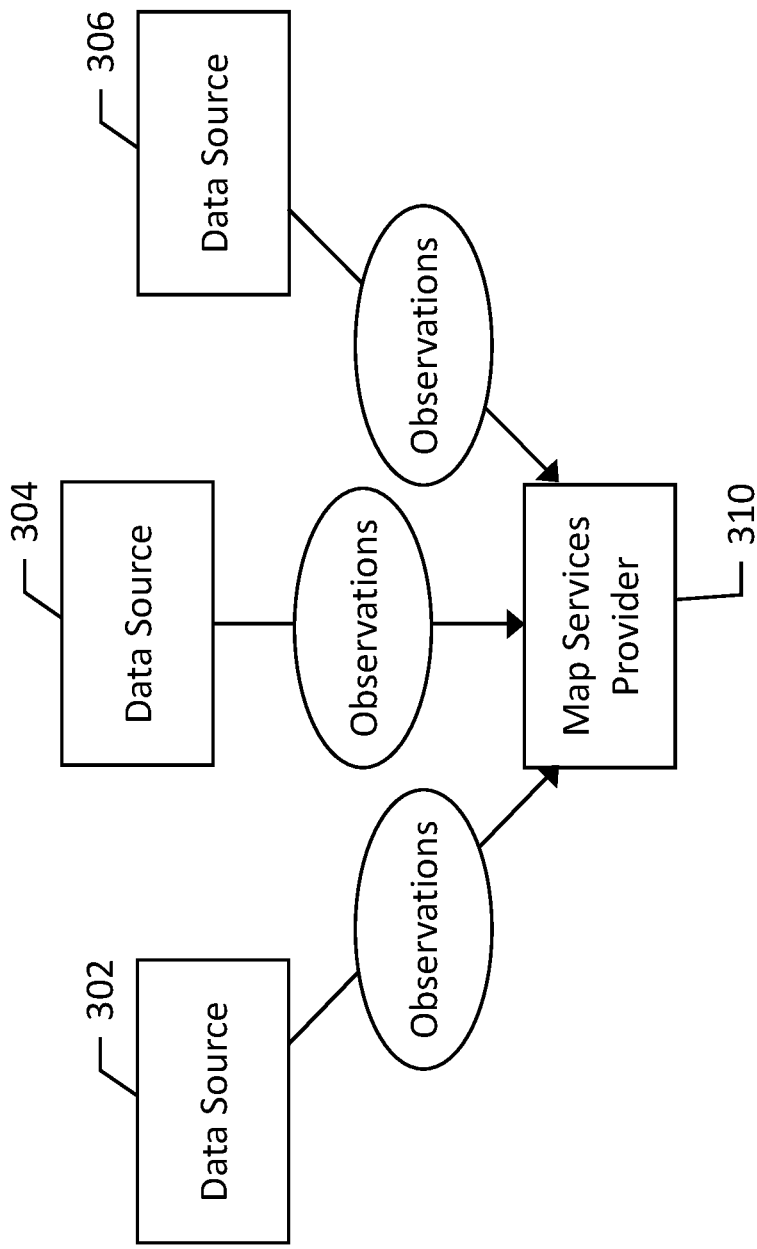
Figure 4:
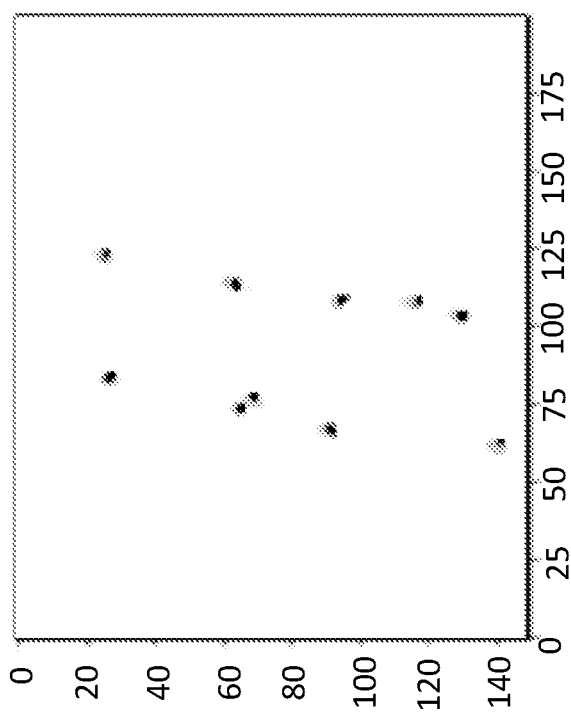
Figure 5:
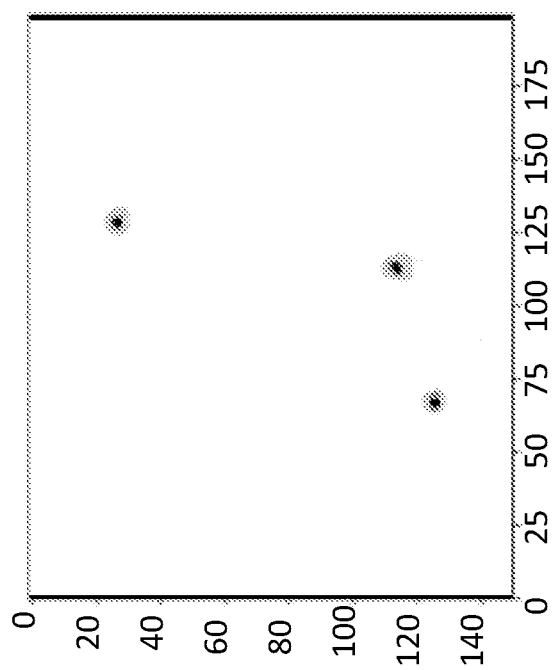
Figure 6:
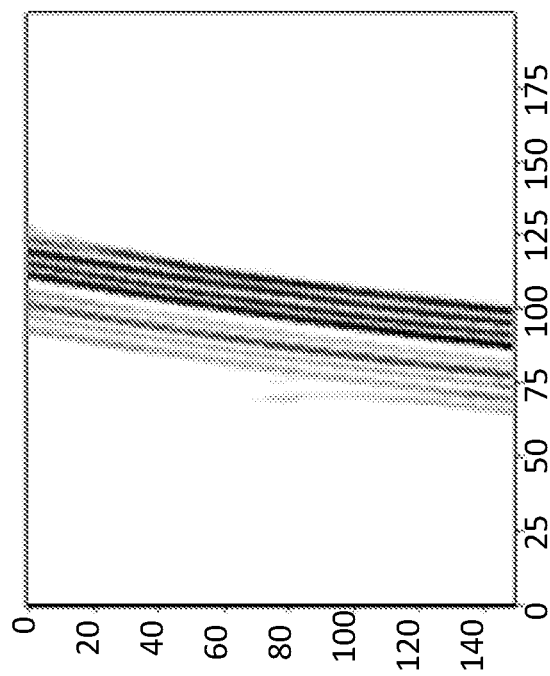
Figure 7:
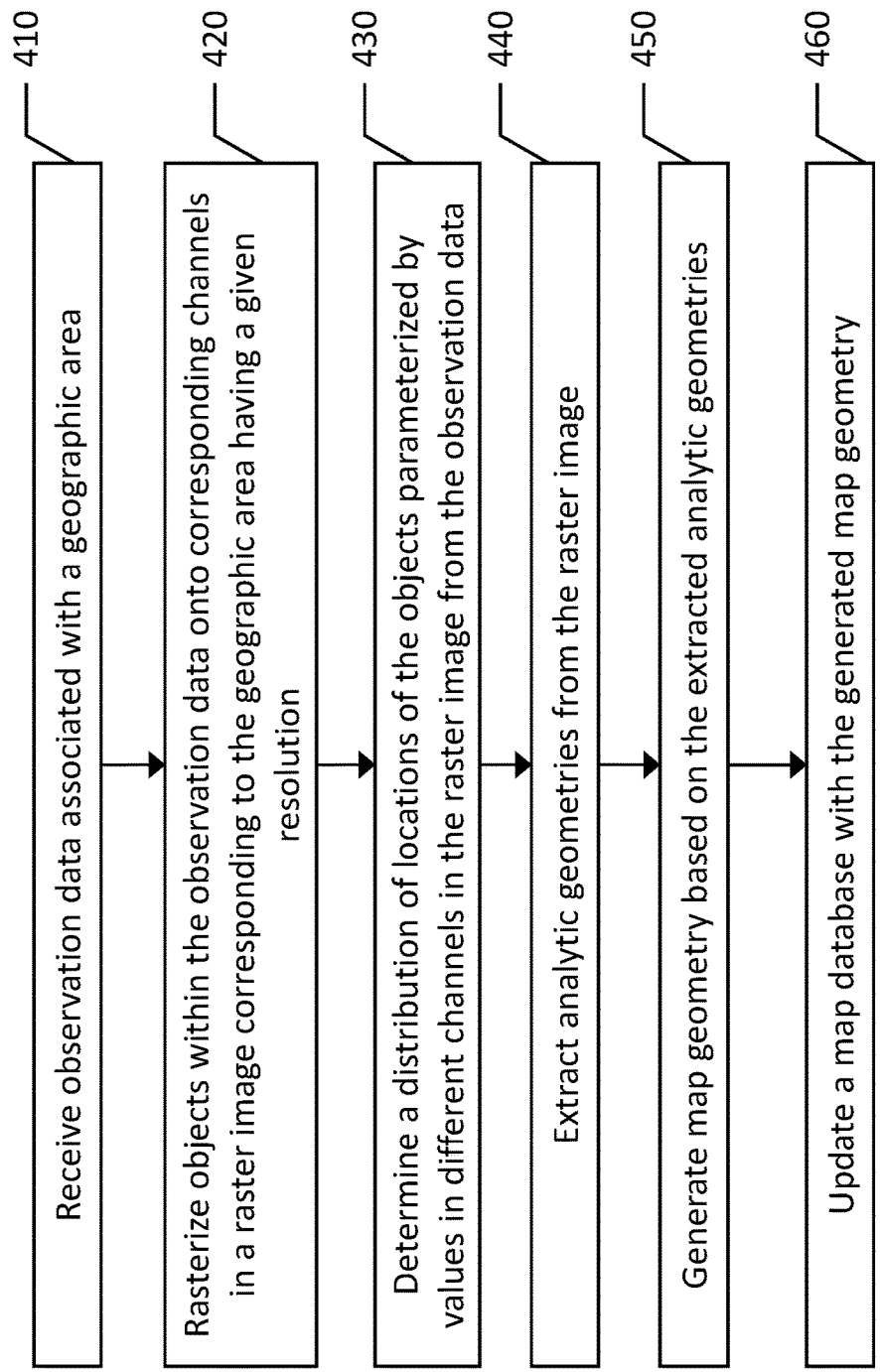

Having thus described example embodiments of the disclosure in general terms, reference will now be made to the accompanying drawings, which are not necessarily drawn to scale, and wherein:

FIG. 1 illustrates a communication diagram of a system for implementing example embodiments described herein according to an example embodiment of the present disclosure;

FIG. 2 is a block diagram of an apparatus for processing data from a variety of sources according to an example embodiment of the present disclosure;

FIG. 3 illustrates aggregation of data from a variety of data sources according to an example embodiment of the present disclosure;

FIG. 4 illustrates an image depicting pole objects within a geographic area including a road segment according to an example embodiment of the present disclosure;

FIG. 5 illustrates an image depicting sign objects within a geographic area including a road segment according to an example embodiment of the present disclosure;

FIG. 6 illustrates an image depicting lane line objects within a geographic area including a road segment according to an example embodiment of the present disclosure; and FIG. 7 is a flowchart of a method of determining object location within map geometry based on data aggregation and conflation according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for generating and correcting map geometry within map data, and more particularly, to generation of map geometry including road and lane geometry through image analysis based on data aggregation and conflation. Road segment paths and lane line geometry are often generated through automated means. However, manual verification and correction is often necessary due to the unique properties of roads in different and unique contexts. As such, even automated means rely heavily on manual processes that are laborious, time intensive, and costly. Because millions of miles of roads exist, the determination of road segment and lane line geometry can be a tedious process. Embodiments described herein provide a reliable manner of generating map geometry through the aggregation of data from various sources in various formats and using conflation to generate one set of map geometries that represents the real-world objects without duplication. The observations or gathered data (e.g., crowdsourced) can be represented in various formats, such as images, extracted analytical geometries, or probe densities that could be overlapping in terms of coverage.

Map geometry generation is complex with vast amounts of area to cover and large amounts of data from different sources informing the map geometry and objects found therein. Analytical geometries such as points, line strings, etc. can be extracted from various data sources, such as probe data density images, satellite images, dash camera images, and LiDAR (light distancing and ranging) images, among others. However, the extracted geometries often include varying qualities (e.g., location accuracy, object detail, etc.) and varying levels of coverage. However, data from different sources can be complementary to each other with information not present in one source potentially being found in other sources. Thus, embodiments described herein aggregate and merge data from different sources in a meaningful way to produce a single map representation that is as close as possible to ground truth.

Embodiments receive observations represented in analytical geometries that are highly overlapping. For example, a point object (e.g., a telephone pole) can be observed in different source data and appear in the set of observations from different sources multiple times, each occurrence having some degree of variation to the actual position of the true object. Further, different parts of one object may occur multiple times in the observation set. Embodiments generate from this data one set of geometries which represents the real world objects without duplication. Embodiments aggregate and conflate data from different sources using Bayesian inference where observations from the different data sources are considered sample measurements of the true locations of the underlying objects. The output is an accurate estimate of the location of the true object within the map geometry.

An example data source includes map data gathered as probe data. The probe data represented as tabular data (e.g., location, time, etc.) that is rasterized to generate images from the probe data to define various aspects of map geometry such as road segment paths, lane line geometry, object detection, traffic determination, and the like. Images are generated from probe data through rasterization of available probe data to generate a graphical representation of probe data that can be used in a variety of processes for map generation, map healing, and dynamic map data. Other forms of gathered data can be aggregated for map generation as described herein. For example, aerial images (e.g., satellite or aircraft collected images), analytical geometries, dashboard cameras, LiDAR sensors, etc.

Embodiments employ an end-to-end approach taking raw data, such as satellite images, probe densities, analytical geometries, or observations of any other format as inputs and generate analytical geometries as output. Embodiments can employ multiple sub modules that process data in different input formats and a mechanism to update map content in a consistent and automatic manner.

As technology advances, the data available for collection has increased in volume, such as with location data from personal hand-held devices and vehicles. Further, data from sensors attached to located vehicles (e.g., image sensors, LiDAR (light distancing and ranging), etc.) and satellite imagery further enhances location data. The available data includes vast amounts of useful information, some of which is time sensitive. For example, traffic jams caused by accidents may be resolved after one hour, but within that one hour the information about the accident and the traffic jam is very valuable and informative to others traveling near the location of the accident. To harness the power of this huge volume of data in a timely fashion, it is beneficial to be able to process the data in an automatic fashion, eliminating or minimizing human interventions that are typically expensive and time consuming.

Generating map data such as road or lane geometries and traffic volumes thereon directly from probe data is challenging. Probe data refers to any data containing a location (e.g., longitude and latitude, such as Global Positioning System coordinates or GNSS coordinates, cartesian coordinates, etc.) collected by devices while moving within an environment. Such devices can include mobile devices (e.g., cell phones), vehicles (e.g., navigation systems), or the like. Such data often includes trajectories, each recording a trip made by a device or vehicle with timestamps associating location coordinates with a time at the location. Location data from vehicles, either collected from the vehicles or from mobile devices traveling within the vehicles, generally includes location data reflecting the path of underlying roads and lanes thereof, and likely real time information (e.g., traffic) that are not yet reflected anywhere. Extracting the underlying map from a large collection of such data is challenging.

Probe data is often very noisy and often sparse for less traveled roads such as residential roads. The use of analytical techniques to create road geometry struggles to create usable road geometry under sparse and noisy probe conditions, and suffers from a large number of hyper parameters that need to be tuned. Using analytical techniques to create lane geometry or paint marking geometry from probe data is practically infeasible due to the fact that consumer grade global positioning systems have a noise level that exceeds the width of a lane, and thus is ineffective at identifying the correct lane of travel.

The collection of rich sensor data from vehicles traveling within a road network, such as image data (e.g., 360-degree camera views) and LiDAR (Light Distancing and Ranging) requires expensive sensor arrays associated with vehicles traveling within a road network. While such technology is being adopted at an ever-increasing rate, this sensor data still has limited coverage relative to the total volume of roads that exist. Sensor arrays of a vehicle can differ among model years and among different manufacturers or OEMs (Original Equipment Manufacturers). These sensor arrays can include cameras, LiDAR, Radar, etc., but due to different technological configurations, data characteristics may vary between different vehicles, between different OEMs, and between model years, for instance. Hence, data received from a first sensor of a first vehicle or OEM may require different processing than data received from a second sensor of a second vehicle or OEM. Further, significant manual effort is still required to derive lane geometry and attributes such as lane count and turn lane data from sensor rich data. Enabling full automation of the creation of high definition (HD) maps including lane geometry and selected attributes from probe data provides improved HD map coverage and enhanced safety functionality. Embodiments described herein aggregate data from different sources with different levels of detail and accuracy to conflate the data and obtain a more accurate estimation of map geometry than any one source of data may provide. Further, embodiments automate this map geometry generation to enable rapid map updates, including real-time or near real-time dynamic data such as traffic, without necessitating manual input.

FIG. 1 illustrates a communication diagram of an example embodiment of a system for implementing example embodiments described herein. The illustrated embodiment of FIG. 1 includes a map services provider system 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as aerial or satellite photography, can be used to generate map geometries directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments described herein construct images from a variety of data sources that can be used for map generation and healing, along with establishing dynamic map data. Embodiments aggregate data from different sources in different formats, process the map data through format-specific modules, and conflate the data to arrive at updated map content in a consistent and automatic manner that eliminates duplicative elements and maintains consistency across data formats. Embodiments use Bayesian inference with data source observations as samples generated around the true underlying ground truth object. The output is an estimate of the true object position within the map geometry.

For map generation, different data sources are better suited to different types of data. Static map data reflects seldom-changing features, while dynamic map data reflects often-changing features in the map data. As used herein, the term static map data or substantially static map data references map data that does not regularly change, but can change over time such as when road paths change due to construction or long-term road closures. Conversely, dynamic map data references map data that changes regularly, such as traffic map data, temporary lane closures, accidents, and the like, that generally last less than a few hours. Thus, static map data can be considered map data that is persistent for twenty four hours or longer, while dynamic map data generally changes over time periods of less than twenty four hours.

Embodiments described herein perform data extraction from different data sources to obtain observations that are aggregated and conflated to establish a true position of map objects within map geometry. Data can be received in a variety of formats, such as satellite or aerial imagery, probe data in tabular form, rasterized probe density histograms, or the like. Rasterization is employed to obtain a rough location of the observations of the objects. For rasterization, different channels of pixels of a rasterized image can be used for different object types, such as pole objects (e.g., telephone poles, light poles, etc.), line objects (e.g., painted lane lines, curbs, guard rails, etc.), and sign objects. Additional channels can be used if there are additional object categories, or sub-categories such as types of signs.

Embodiments of the present disclosure formulate a loop for a continuously updating model. The model represents the latest understanding of the map geometry at any given time. A Bayesian approach is used to make updates in a continuous manner. Ideally the model is continuously improved through training.

FIG. 3 illustrates an example embodiment in which a continuous stream of new observations are received, such as from vehicles traveling within a road network, aerial images, stationary sensors, etc. These different data sources are represented as data source 302, data source 304, and data source 306. The observations from the different data sources can be received, for example, by a map services provider 310 or other entity functioning to aggregate and conflate the observation data. These different sources of data provide observations that can include different information with different levels of detail regarding a given geographic area. This continuous stream of new observations can be in real-time to benefit dynamic map data. Further, these real-time new observations can be used for map generation, map healing, and localization of the vehicle or device gathering the observations.

The model described herein to aggregate and conflate the observation data is a probabilistic model, where a real-world object is described by its location, such as at position (x, y). The probability of observing the object at location (x, y) is described as p(x, y) with a peak of the probability distribution at the location of the true object. Observations $o_i$ described by the observed location $(x_i, y_i)$ can be viewed as samples drawn from the distribution of p(x, y). The goal of this model is to learn the probability p(x, y) that maximizes the likelihood of the observations in the data:

$$p(x, y) = \max_\theta \prod_i p(o_i|x, y, \theta)$$

The probability distribution can be represented as a raster image for an area of interest with a given resolution. This way p(x, y) is parameterized as $W_{ij}$, where $W_{ij}$ indicates the probability of observing the object at pixel (i, j). Each observation in the data is rasterized onto the corresponding raster. Pixels touched by the observation are considered as positive samples. Surrounding pixels not touched by the observations are considered as negative samples. Each sample can be represented by (i,j, label). The model maximizes the log likelihood of the data or alternatively, minimizes the cross entropy:

$$\sum_o \sum_{ij} (w_{ij} l_{ij} + (1 - l_{ij})(\log(1 - \exp w_{ij})))$$

The model is unsupervised, trained using observations from the different data sources to generate the rasterized probability image representing the best estimate of true locations of objects within the mapped environment. This training can be continuous as observations are continuously received from the different data sources.

After the model is trained, the model outputs images depicting object locations. FIG. 4 illustrates an example embodiment of an image depicting pole objects within a geographic area including a road segment. While different object types can be represented in a single image using different channels of the pixels (e.g., color, intensity), embodiments of FIGS. 4-6 each reflect only a single object type whose location is conveyed by a black hue, with the peak of the probability rendered in black, while the periphery of the probability appears gray and transitions to white at negative sample pixels. The pixels of the rasterized image are rendered based on the parameterized distribution for the respective object. Depicting the probability of observing the respective object at each of the pixels proximate the object location can be depicted using at least one property of the pixels proximate the object location, which in the example embodiment of FIG. 4, is an intensity of the pixel hue (black in the illustrated embodiment). FIG. 5 illustrates an image depicting sign objects within the same geographic area represented in FIG. 4. FIG. 6 illustrates lane line objects within the same geographic area represented in FIGS. 4 and 5.

With observation data being continuously received, there are generally relatively large amounts of data gathered for a particular geographic area. With greater amounts of data, the image quality is relatively higher since statistical approaches as described herein benefit from more data. However, processing of large volumes of data may be time consuming and costly, such that embodiments can employ variable sampling schemes to reduce the amount of data processed. One such scheme is variable frequency, where roads of functional classes FC1 and FC2 such as highways with high traffic volumes are sampled less frequently than less driven residential roads, such as in functional classes FC4 and FC5. Optionally, the sampling time window may be varied based on how frequently certain roads are driven, such that FC1 and FC2 highways are sampled over a shorter time range compared to less driven roads such as FC4 and FC5 road that can be sampled over longer time windows. Notably, using non-uniform time windows may not be optimal for road geometry change detection.

According to embodiments described herein, not all types of observations will be present for a given area. For example, in a heavily treed area or an urban area, satellite imagery may not be available. The architecture of the embodiments described above can still be employed using data sources to still obtain the object locations in the images as described above.

As described above, automatic map geometry generation is solved in the image domain, with object locations depicted on rasterized images to formulate the problem as a vision problem that benefits from computer vision processes to improve functionality and efficiency. For example, converting observations into rasterized images, embodiments can employ, among other image processing models and algorithms, image deblurring techniques to restore the location data to a road segment or lanes of the road segment. Both the input rasterized image and the output generated map could be in the format of images. The inputs of such an embodiment can be images of observation probabilities, which can be considered as the blurred versions of the output images. By formatting the problem in the image domain, it is possible to employ image models to solve the problems addressed herein.

The rasterization of observation data to form images can be images reflecting a period of time, as noted above, with shorter duration time windows reflecting dynamic probe data and longer periods of time better reflecting less dynamic or static data. The images created through the rasterization of observation data can be used in a variety of manners to generate map data and to repair map data geometries. Different image processing functions and algorithms can be applied to the images according to how the data is to be used, such as through use of deblurring, map data extraction, YOLO (you only look once) object detection, graph estimation, etc.

Calculating observation statistics for each pixel can be computationally intensive as the underlying probe volume could be in the millions or potentially billions, particularly as probe devices proliferate. To be able to process the data in a timely manner is crucial to extract real-time information when processing dynamic map data. Aggregation of the relevant observation data is performed in an example embodiment by an aggregating query from a large in-memory database. The obtained aggregated observation data is then forwarded to parallelized instances that perform the rasterization for outputting images, either in image format or in multi-dimensional arrays/tensors corresponding to the target image size manageable by the image data model of choice. Using this process, data processing for an area of three kilometers by three kilometers can be performed efficiently, such as within seconds or minutes.

Creating rasterized observation data facilitates map healing and generation and can provide dynamic map data accurately and quickly while reducing processing requirements and capitalizing on image analysis models and algorithms. Using the images generated from observation data, embodiments can employ image processing models and algorithms to extract map geometry from the images generated from probe data. Image deblurring is an example of such an algorithm. Image deblurring have been used to restore enhanced detail even when the blur pattern is unknown, such as in a blind deconvolution.

Road geometry and lane line geometry of example embodiments provided herein can be instrumental in establishing turn maneuvers at intersections. When incorrect lane line geometry exists, such as historical lane data that has been changed, lane line geometry cannot reliably be used by autonomous vehicles for autonomous control through the region of incorrect lane lines. While autonomous vehicles can employ sensor data collected on board the vehicle for control within an environment, the use of road geometry and lane line geometry enhances autonomous vehicle control and provides redundancy that improves efficiency, effectiveness, and safety of autonomous vehicle control. The efficient methods described herein rasterize probe data to generate images such that the problem of road geometries and lane line geometries can be solved through image processing techniques.

FIG. 7 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 7. The illustrated method may be performed, for example, by apparatus 200 using processor 202 with program code instructions stored in memory 204 to cause the apparatus to perform the operations of the method of FIG. 7. As shown at 410, apparatus is caused to receive observation data associated with a geographic area. Objects are rasterized within the observation data onto corresponding channels in a raster image at corresponding to the geographic area having a given resolution as shown at 420. A distribution of locations of the objects parameterized by values in different channels in the raster image from the observation data is determined at 430. Analytic geometries are extracted at 440 from the raster image. Map geometry is then generated at 450 based on the extracted analytic geometries. A map database with the generated map geometry is updated at 460.

In an example embodiment, an apparatus for performing the methods of FIG. 7 above may include a processor (e.g., the processor 202) configured to perform some or each of the operations (410-460) described above. The processor may, for example, be configured to perform the operations (410-460) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-460 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
receive observation data associated with a geographic area;
rasterize objects within the observation data onto corresponding channels in a raster image corresponding to the geographic area having a given resolution;
determine a distribution of locations of the objects parameterized by values in different channels in the raster image from the observation data;
extract analytic geometries from the raster image;
generate map geometry based on the extracted analytic geometries; and
update a map database with the generated map geometry.

2. The apparatus of claim 1, wherein causing the apparatus to determine a distribution of locations of the objects parameterized by values in different channels in the raster image from the observation data comprises causing the apparatus to:
calculate a log likelihood of the objects at the locations within the raster image given corresponding distributions as parameterized by values in different channels of the raster image.

3. The apparatus of claim 2, wherein causing the apparatus to calculate a log likelihood of the objects at the locations within the raster image given corresponding distributions as parameterized by values in different channels of the raster image comprises causing the apparatus to update the values in the different channels of the raster image to increase the log likelihood.

4. The apparatus of claim 1, wherein the apparatus is further caused to determine a probability of observing a respective object at pixels proximate a location of the respective object based on the distribution of the location for the respective object.

5. The apparatus of claim 1, wherein the apparatus is further caused to render pixels of the rasterized image based on the distribution of locations of the objects parameterized by the values in different channels in the raster image from the observation data.

6. The apparatus of claim 5, wherein channels in the raster image comprises at least one of pixel color or pixel intensity.

7. The apparatus of claim 1, wherein causing the apparatus to extract analytic geometries from the raster image comprises causing the apparatus to apply a skeletonization algorithm to the raster image to extract the analytic geometries.

8. A method comprising:
receiving observation data associated with a geographic area;
rasterizing objects within the observation data onto corresponding channels in a raster image corresponding to the geographic area having a given resolution;
determining a distribution of locations of the objects parameterized by values in different channels in the raster image from the observation data;
extracting analytic geometries from the raster image;
generating map geometry based on the extracted analytic geometries; and
updating a map database with the generated map geometry.

9. The method of claim 8, wherein determining a distribution of locations of the objects parameterized by values in different channels in the raster image from the observation data comprises:
calculating a log likelihood of the objects at the locations within the raster image given corresponding distributions as parameterized by values in different channels of the raster image.

10. The method of claim 9, wherein calculating a log likelihood of the objects at the locations within the raster image given corresponding distributions as parameterized by values in different channels of the raster image comprises updating the values in the different channels of the raster image to increase the log likelihood.

11. The method of claim 8, further comprising determining a probability of observing a respective object at pixels proximate a location of the respective object based on the distribution of the location for the respective object.

12. The method of claim 8, further comprising rendering pixels of the rasterized image based on the distribution of locations of the objects parameterized by the values in different channels in the raster image from the observation data.

13. The method of claim 12, wherein channels in the raster image comprises at least one of pixel color or pixel intensity.

14. The method of claim 8, wherein extracting analytic geometries from the raster image comprises applying a skeletonization algorithm to the raster image to extract the analytic geometries.

15. A computer program product comprising at least one non-transitory computer-readable storage medium having computer-executable program code instructions stored therein, the computer-executable program code instructions comprising program code instructions to:
receive observation data associated with a geographic area;
rasterize objects within the observation data onto corresponding channels in a raster image corresponding to the geographic area having a given resolution;
determine a distribution of locations of the objects parameterized by values in different channels in the raster image from the observation data;
extract analytic geometries from the raster image;
generate map geometry based on the extracted analytic geometries; and
update a map database with the generated map geometry.

16. The computer program product of claim 15, wherein the program code instructions to determine a distribution of locations of the objects parameterized by values in different channels in the raster image from the observation data comprise program code instructions to:
calculate a log likelihood of the objects at the locations within the raster image given corresponding distributions as parameterized by values in different channels of the raster image.

17. The computer program product of claim 16, wherein the program code instructions to calculate a log likelihood of the objects at the locations within the raster image given corresponding distributions as parameterized by values in different channels of the raster image comprise program code instructions to update the values in the different channels of the raster image to increase the log likelihood.

18. The computer program product of claim 15, further comprising program code instructions to determine a probability of observing a respective object at pixels proximate a location of the respective object based on the distribution of the location for the respective object.

19. The computer program product of claim 15, further comprising program code instructions to render pixels of the rasterized image based on the distribution of locations of the objects parameterized by the values in different channels in the raster image from the observation data.

20. The computer program product of claim 15, wherein the program code instructions to extract analytic geometries from the raster image comprise program code instructions to apply a skeletonization algorithm to the raster image to extract the analytic geometries.

* * * * *